Patented May 23, 1944

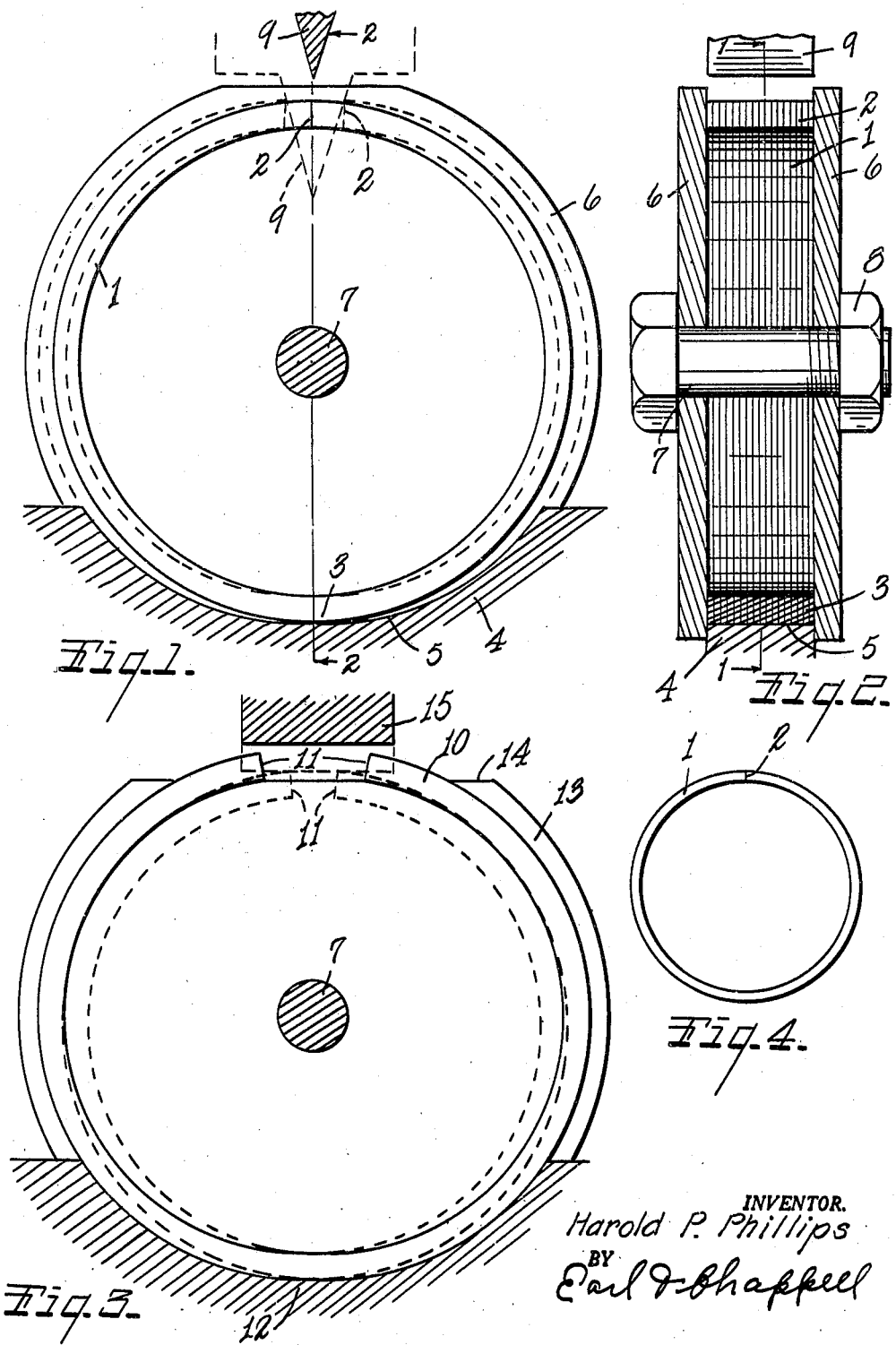

2,349,372

UNITED STATES PATENT OFFICE 2,349,372

METHOD OF PROCESSING SPLIT PISTON RING ELEMENTS

Harold P. Phillips, Hastings, Mich., assignor to Hastings Manufacturing Company, Hastings, Mich., a corporation of Michigan Application February 23, 1942, Serial No. 431,993

6 Claims. (Cl. 29—156.6)

This invention relates to improvements in method of processing split piston ring elements.

This is a continuation in part of my copending application for Letters Patent, Serial No. 274,873, filed May 22, 1939.

The main objects of this invention are:

First, to provide a method of producing or processing thin split steel, ribbon-like piston ring elements, adapting the same to assume a truly circular outline when operatively compressed and installed on a piston in a cylinder.

Second, to provide a method for processing ring elements of the type described which is exceedingly simple and very expeditiously carried out cold or at room temperature, and without special heat treatment of any kind.

Third, to provide a method of producing ring elements of the type described wherein the free ends of the thin split elements adjacent the gap therein are radially compressed and deformed to render the elements generally oblate in outline so as to assume a truly circular outline when mounted in the piston ring groove of a piston and operatively compressed within a coacting cylinder.

Objects relating to details and economies of the invention will appear from the description to follow. The invention is defined in the claims.

Preferred embodiments of the invention are illustrated in the accompanying drawing, wherein:

Fig. 1 is a diagrammatic view in section on line 1—1 of Fig. 2 illustrating certain forming instrumentalities used in performing the method of the invention, showing a piston ring element or elements in operative relation to said instrumentalities and indicating the manner of manipulating the latter in practicing the method.

Fig. 2 is a fragmentary view in section on line 2—2 of Fig. 1.

Fig. 3 is a fragmentary view in section generally similar to Fig. 1, illustrating the steps of a modified practice of the method or process of the invention, and Fig. 4 is a view illustrating a ring element in the form of a thin steel ribbon-like annulus prior to processing in accordance with the invention.

In my Patent No. 2,148,997, dated February 28, 1939, I illustrate and claim a composite piston ring or piston ring assembly having as elements thereof a pair of thin split annular elements of steel, the aforesaid elements being adapted to be associated with spacer and expander members in a piston groove and constituting the cylinder wall contacting elements of the said composite ring. Such elements are characterized essentially by their thin ribbon-like section, and being of steel as contrasted to cast iron, the radial width thereof substantially exceeding the axial thickness in order to secure a lively and sufficiently strong expansive action with accompanying high unit wall tension together with durability. Though in particular cases these dimensions may be varied somewhat, the ratio of the radial width to the axial thickness is approximately, or of the order of, four to one. I have found that when the aforesaid split cylinder contacting steel elements are made from coiled ribbon steel in round coiled section, with the gap thereof compressed for insertion in the cylinder, they tend to bear on the cylinder wall at the points or free ends and at a point 180° from the free ends with substantially greater force than at other intermediate points. This is apt to result in uneven wear on the cylinder wall and to some degree affects the engagement peripherally of the said element. In the production of the usual cast iron piston ring, this condition may be taken care of in the casting operation, however such is of course not possible in the production of thin ribbon steel elements of the type described, which are formed of ribbon steel coiled edgewise and cut after coiling. The present invention is primarily concerned with the production of a ring element formed of ribbon steel or other suitable ribbon-like strips eliminating this defect and with the method by which such a ring element may be quickly and readily processed.

Referring to the drawing, the reference numeral 1 indicates a thin annular split element formed by coiling ribbon steel in accordance with the invention, which I produce initially in practically continuous circular form as illustrated in solid lines in Fig. 1, i. e., without a substantial gap between the free ends 2 thereof. I dispose a plurality of such circular elements 1 in a stack, as illustrated in Fig. 2, and rest the side 3 thereof opposite the free ends upon a supporting block 4 having a concave bed 5.

It is the purpose of my invention to work the elements 1 from the perfectly circular form illustrated in dotted lines to the somewhat oblate form outlined in dotted lines in Fig. 1, and to this end the concave bed is of an outline corresponding to the finished outline of the rings, so far as it engages the rings during the processing.

With the stack of rings 1 resting on block 4 as described, I clamp the same axially by a pair of side plates 6 which confine and support the rings throughout the entire vertical dimension thereof. The plates are drawn together by means such as a bolt 7 and nut 8. The next step is to cause a simultaneous radial and circumferential hammering or compressing action or force to be exerted on the free ends 2 so as to spread the same from solid line position to dotted line position as shown in Fig. 1. In order to accomplish this, I employ a wedge-shaped tool designated 9, the point of this tool being inserted between the free ends 2 and a blow or blows or thrusts or forces being applied to the tool.

The forces, either abrupt blows or gradually applied forces, are applied to tool 9 in a radial direction with the result that the element is conformed into an oblate outline. This working of the ring is done with the latter in unheated or cold condition, i. e., at room temperature, so that there is no change of the original desired grain structure due to heating. This also dispenses with the time, labor and uncertainty involved in heat treating processes, thereby reducing the production cost and eliminating a source of non-uniformity in the resultant products.

When the aforesaid processing steps have been completed, it will be found that the elements, although generally circular, are actually slightly oblate in form with their major axes at 90° to a line through the center and gap. I find that such a ring having the points thereof projecting radially slightly less sharply than the usual element will, when on a piston in the cylinder, become round and bear on the cylinder wall uniformly around the circumference of the ring. This provides the most effective sealing action and also minimizes wear on the cylinder wall and prevents localized wear on the ring elements.

In Fig. 3, I illustrate a modified embodiment of the invention, wherein a stack of the thin steel annular split ring elements 10 are shown with their free ends 11 substantially spaced.

In order to conform elements of this type to the preferred oblate outline of the rings of my invention, it is necessary to support the same on a suitably curved anvil or rest 12 with the sides thereof confined by side plates 13, however these side plates should be cut away at 14 to expose the free ends 11. These ends are then hammered or pressed radially by a radially acting thrust die or hammer 15 to deflect the same from the position illustrated in solid lines in Fig. 3 to that shown in dotted lines, which is the desired slightly out-of-round or oblate outline characterizing the rings of my invention, the ends being spaced in relaxed condition and adapted when inserted in a ring groove of a piston and compressed in a cylinder to become round and exert a uniform expanding action on the cylinder wall. This is also a cold working process.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. The method of forming thin split steel piston ring elements comprising the steps of coiling a thin split steel element of circular outline from ribbon steel coiled edgewise, supporting such element radially at a point substantially opposite the split thereof and axially supporting the sides thereof substantially throughout its diameter to prevent any substantial lateral distortion during subsequent forming steps, and while so supported changing the element from its coiled circular outline to a permanently set oblate outline when in relaxed condition with the major axis thereof approximately at right angles to a radial line extending between the ends thereof at the split by simultaneously applying a plurality of radially and inwardly directed forming blows to the free ends of such ring element while it is at normal room temperature.

2. The method of forming thin split steel piston ring elements comprising the steps of forming a thin split steel element of circular outline, supporting such element radially at a point substantially spaced from the split thereof and axially supporting the sides thereof to prevent any substantial distortion during subsequent forming steps, and while so supported changing the element from a circular outline to a permanently set oblate outline when in relaxed condition with the major axis thereof approximately at right angles to a radial line extending between the ends thereof at the split by simultaneously applying a plurality of successive radially and inwardly directed forming forces to the free ends of such ring element while it is at normal room temperature.

3. The method of forming thin split steel piston ring elements of oblate outline when in relaxed condition with the major axis thereof approximately at right angles to a radial line extending between the ends thereof at the split, comprising the steps of forming a substantially flat thin split steel element of circular outline from ribbon steel coiled edgewise, supporting such ring element edgewise at a point substantially spaced from the split thereof and sidewise to prevent any substantial lateral distortion thereof during subsequent forming steps, and cold working while so supported by repeatedly and simultaneously applying inwardly and radially directed forces to both ends of the circular ring element to conform it to a permanent set in such oblate form when relaxed with the ends of the ring lying substantially within the initial circular position thereof.

4. The method of forming thin split steel piston ring elements of oblate outline when in relaxed condition with the major axis thereof approximately at right angles to a radial line extending between the ends thereof at the split comprising the steps of forming a thin substantially flat steel element of circular outline from ribbon steel coiled edgewise, supporting said circular ring element sidewise substantially from end to end thereof to prevent any substantial lateral distortion during subsequent forming steps and edgewise at a point substantially spaced from the split thereof, and while so supported cold working by simultaneously and repeatedly applying inwardly and radially directed forces to both ends of the ring element to produce a permanent set in such oblate form when the ring element is relaxed with the ends of the ring lying substantially within the initial circular outline thereof.

5. The method of forming thin split steel piston ring elements comprising the steps of forming a thin split steel element of circular outline from ribbon steel coiled edgewise, supporting such element radially at a point substantially spaced from the split thereof and axially supporting the sides thereof to prevent any substantial lateral movement during subsequent forming steps, and while the ring element is so supported changing the element from its coiled circular outline to a permanently set oblate outline when in relaxed condition with the major axis thereof approximately at right angles to a radial line extending between the ends thereof at the split by simultaneously applying a plurality of radially and inwardly directed forming blows to the free ends of such ring element.

6. The method of forming thin split steel piston ring elements of oblate outline when in relaxed condition with the major axis thereof approximately at right angles to a radial line extending between the ends thereof at the split, comprising the steps of forming a thin substantially flat split steel element of circular outline from ribbon steel coiled edgewise, supporting said circular ring element at a point substantially spaced from the split thereof, and while in cold condition simultaneously and repeatedly applying radially and inwardly directed forces to both ends of the ring element while so supported to produce a permanent set in such oblate form when the ring element is relaxed with the ends of the ring lying substantially within the initial circular outline thereof.

HAROLD P. PHILLIPS.